Jan. 8, 1935. J. DOBRICHOVSKY 1,987,434
SAFETY GRIP LOCK CYLINDER
Filed April 12, 1934
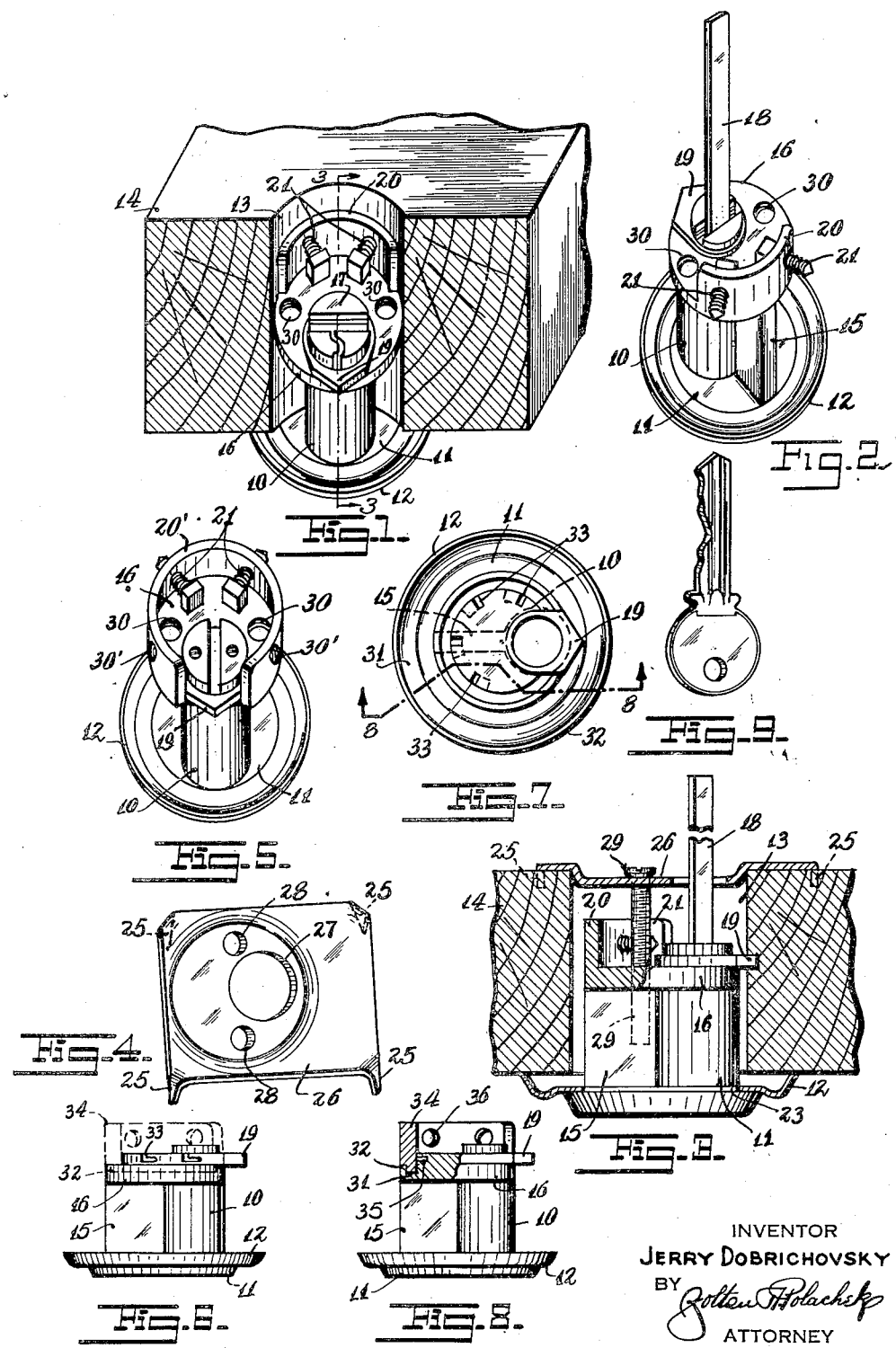
INVENTOR
JERRY DOBRICHOVSKY
BY
ATTORNEY Patented Jan. 8, 1935

1,987,434

UNITED STATES PATENT OFFICE 1,987,434

SAFETY GRIP LOCK CYLINDER

Jerry Dobrichovsky, New York, N. Y.

Application April 12, 1934, Serial No. 720,260

8 Claims. (Cl. 70—46)

This invention relates to new and useful improvements in a safety grip for the cylinder of a lock cylinder.

More particularly the invention proposes an arrangement in combination with a lock cylinder which engages into a bore through a door, of a safety grip including a peripheral flange associated with a transverse flange formed with a pointed portion adapted to be forced into the wall of the bore and radial screws through said peripheral flange for engagement against the wall of the bore in a manner so as to force the pointed portion into the wall of the bore.

Still further the invention proposes an arrangement whereby the peripheral flange extends substantially through a fragmentary portion of the periphery of the transverse flange.

Still further an arrangement is proposed wherein the screws are arranged substantially diametrically opposite the pointed portion so as to readily urge the pointed portion into position when forced into place.

Still further the invention proposes an arrangement whereby the heads of the screws may be easily reached from the outside so that they may be driven into position.

Still further the invention also contemplates an arrangement whereby the peripheral flange is of increased length and is provided with extra threaded openings for extra screws to aid in conjunction with said radial screws for the further holding of the lock cylinder in position.

Still further the invention also proposes an arrangement whereby the peripheral flange is removably held in position allowing its removal and replacement with other similar flanges for a selection of the size of radial clamping screws or other purposes as desired.

Still further the invention particularly proposes the provision of a groove upon the free face of the transverse flange along its periphery associated with bayonet slots, and peripheral flange members engageable in said grooves and provided with pins insertable in said slots in a manner so that the peripheral flange members may be engaged and disengaged from the transverse flange as desired.

Still further the invention proposes the construction of a device as mentioned which is simple and durable and which may be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a perspective view of a portion of a conventional cylinder lock equipped with a safety grip according to this invention and shown in position in a door, the door being shown in section.

Fig. 2 is a perspective rear view of the mechanism illustrated in Fig. 1 but also showing the rod from the cylinder of the lock to operate lock mechanism not illustrated on the drawing.

Fig. 3 is a transverse sectional view as though taken on the line 3—3 of Fig. 1 but illustrated with numerous parts not shown in section. This view also shows the transmission rod.

Fig. 4 is a perspective view of the plate upon the inner side of the door over which the lock mechanism as shown or described in this specification is located.

Fig. 5 is a side elevational view of a portion of a cylinder lock with a safety grip according to a modification of this invention.

Fig. 6 is a plan view of Fig. 5.

Fig. 7 is a fragmentary view taken on the line 7—7 of Fig. 6 but numerous portions not being shown in section.

Fig. 8 is a fragmentary sectional view taken on the line 8—8 of Fig. 7.

Fig. 9 is a perspective view of a key for operating the lock.

The safety grip for the lock cylinder according to this invention is appliable to conventional types of cylinder locks. It is shown applied to one particular kind of cylinder lock having a cylinder casing 10 in which the cylinder with the tumblers not shown on the drawing, operates. The cylinder casing 10 is integral with a conventional outside plate 11 associated with an escutcheon ring 12 adapted to engage against the outside face of the door. The cylinder lock is shown engaged into a bore 13 of a door 14. A rib 15 projects from one side of the casing 10 in which the tumblers, not shown on the drawing are engaged. The inner end of the lock cylinder casing is provided with a conventional flange 16. The inner end of the cylinder of the lock is illustrated and designated by reference numeral 17 in which the rod 18 engages and is connected with for the purpose of operating the lock mechanism, not shown on the drawing. It is believed that the construction will readily be recognized since the particular type of lock is very popular at the present time.

The construction now departs from the conventional construction in the provision of a pointed portion 19 formed upon one side of the transverse flange 16 and adapted to be forced into the wall of the bore 13. A peripheral flange 20 is associated with the transverse flange 16 and carries several radial screws 21 threadedly engaged therethrough and adapted to engage against the wall of the bore for the purpose of shifting the position of the transverse flange so that the pointed portion 19 imbeds itself into the wall of the bore.

The transverse flange 16 is of a slightly smaller size than the diameter of the bore 13 so that it may shift slightly within the bore. The pointed portion 19 projects but a slight distance from the side of the flange 16 so that normally the lock may be easily moved into and removed from the bore 13. The screws 21 are arranged upon radii of the flange 20 and are provided with square heads so that they may be readily engaged with a conventional wrench for the purpose of driving them and removing them from positions. The screws 21 threadedly engage through the flange 20. In Fig. 3 the device is shown in the operative position wherein the screws 21 are driven against the wall of the bore 13 with the points slightly imbedded in a manner so that the pointed portion 19 imbedded itself into the wall of the bore. In this condition of the device the cylinder cannot possibly be removed from the outside of the door.

The lock cylinder when inserted into the bore should be so engaged that the escutcheon plate 12 is in intimate contact with the outer face of the door. The escutcheon plate 12 is formed with an inner diameter resting upon a reduced diameter 23 upon the plate 12 so that these parts are joined as an integral unit and cannot be shifted relative to each other.

The gripping means according to this invention is used in conjunction with the conventional gripping means illustrated upon the drawing especially in Figs. 3 and 4. This conventional means comprises a plate 24 for location upon the inner side of the door and having several prongs 25 directed inwards adapted to be imbedded into the door when the plate is in position. The plate is formed with an inward depressed portion 26 adapted to engage into the edge of the bore 13. The plate 24 is formed with an opening 27 through which the bar 18 extends so as to engage into the lock mechanism, (not shown). The plate 24 is also provided with a pair of openings 28 through which screws 29 engage. The heads of these screws rest against the edges of the openings 28 while the screws threadedly engage through threaded openings 30 formed in the flange 16. It will be readily understood that as the screws 29 are tightly driven into place the cylinder portion of the lock will be further held in conjunction with the gripping means according to this invention.

In Fig. 5 a modification of the invention has been disclosed wherein the device is provided with a peripheral flange 20' extending substantially the entire periphery of the transverse flange 16 except at the pointed portion 19. This contrasts with flange 20 which extends substantially through 180° of the transverse flange 16. The peripheral flange 20' is provided with screws 21 as previously described. In addition to the diametrically opposite screws 21 it is provided with tapped openings 30 adapted to accommodate an additional pair of holding screws. According to this form the cylinder portion of the lock is engaged upon a door as follows:—

First the lock is inserted from the front of the door so that the escutcheon ring 12 and the plate 11 engage tightly upon the front of the door. Then the screws 21 are driven inwards so that the flange portion is shifted slightly for imbedding the pointed portion 19 into the wall of the bore. In addition the pointed front ends of the screw 21 imbed themselves into the wall of the bore which supplements the holding of the lock. When the lock portion has been tightly secured in this position then additional screws, not shown on the drawing, but similar in construction with the screws 21 are engaged through the threaded openings 30 and tightly clamp against the wall of the bore so as to supplement the gripping action. The supplementary screws ordinarily are not needed since the woods of ordinary doors are such that two screws 21 and the pointed portion 19 may sufficiently grip to maintain the lock portion in position. In the event that the wood of the door is of such a character, for example exceptionally hard, then the additional security of the additional two screws are necessary.

In Figs. 6–7 inclusive a modification of the invention has been disclosed wherein the device is provided with removable peripheral flanges carrying the clamp screws. More particularly according to this form the lock portion is provided with the transverse flange 16 having the pointed portion 19. A groove 31 is formed in the free top face of the transverse flange 16 along the periphery thereof. This groove produces a small lip 32 along the periphery of the flange. Several bayonet slots 33 are formed into the transverse flange extending inwards from the free top face thereof and laterally along the side wall of the groove 31.

Several peripheral flange members 34 have reduced lower ends adapted to engage into the groove 31 and are provided with pins 35 adapted to engage in the bayonet slots 33 for maintaining the position of the flange members. These flange members are provided with threaded openings 36 for receiving the screws 21 as previously described.

With the arrangement described in the previous paragraph the flange members 34 may be removed by moving them slightly laterally to disengage the pins 35 from the inner ends of the bayonet slots and then they may be moved vertically upwards so that the pins move out from the free openings of the bayonet slots. The removable construction of the flange members is of advantage in that substitution and changing is possible. Thus, if one of the threaded openings for the screws becomes damaged or if it is desired that a heavier screw or lighter screw be used a corresponding flange member may be substituted for one upon the lock.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. In combination with a lock cylinder casing which engages into the bore of a door, a safety grip, comprising a transverse flange on the inner end of said cylinder casing and of a diameter slightly smaller than the diameter of the bore and formed at one side with a pointed portion adapted to be forced into the wall of the bore, a peripheral flange associated with said transverse flange, and radial screws threadedly engaged through said peripheral flange for engaging against the wall of the bore and forcing the pointed portion into the wall of the bore.

2. In combination with a lock cylinder casing which engages into the bore of a door, a safety grip, comprising a transverse flange on the inner end of said cylinder casing and of a diameter slightly smaller than the diameter of the bore and formed at one side with a pointed portion adapted to be forced into the wall of the bore, a peripheral flange associated with said transverse flange, and radial screws threadedly engaged through said peripheral flange for engaging against the wall of the bore and forcing the pointed portion into the wall of the bore, said pointed portion being thinner than the thickness of said transverse flange so that it is more adapted to be forced into the wall of the bore.

3. In combination with a lock cylinder casing which engages into the bore of a door, a safety grip, comprising a transverse flange on the inner end of said cylinder casing and of a diameter slightly smaller than the diameter of the bore and formed at one side with a pointed portion adapted to be forced into the wall of the bore, a peripheral flange associated with said transverse flange, and radial screws threadedly engaged through said peripheral flange for engaging against the wall of the bore and forcing the pointed portion into the wall of the bore, said peripheral flange being of the semi-annular shape.

4. In combination with a lock cylinder casing which engages into the bore of a door, a safety grip, comprising a transverse flange on the inner end of said cylinder casing and of a diameter slightly smaller than the diameter of the bore and formed at one side with a pointed portion adapted to be forced into the wall of the bore, a peripheral flange associated with said transverse flange, and radial screws threadedly engaged through said peripheral flange for engaging against the wall of the bore and forcing the pointed portion into the wall of the bore, said radial screws being provided with heads radially adapted to be engaged with a wrench so that they may be turned.

5. In combination with a lock cylinder casing which engages into the bore of a door, a safety grip, comprising a transverse flange on the inner end of said cylinder casing and of a diameter slightly smaller than the diameter of the bore and formed at one side with a pointed portion adapted to be forced into the wall of the bore, a peripheral flange associated with said transverse flange, and radial screws threadedly engaged through said peripheral flange for engaging against the wall of the bore and forcing the pointed portion into the wall of the bore, said radial screws comprising a pair and arranged diametrically opposite to the pointed portion of said transverse flange.

6. In combination with a lock cylinder casing which engages into the bore of a door, a safety grip, comprising a transverse flange on the inner end of said cylinder casing and of a diameter slightly smaller than the diameter of the bore and formed at one side with a pointed portion adapted to be forced into the wall of the bore, a peripheral flange associated with said transverse flange, and radial screws threadedly engaged through said peripheral flange for engaging against the wall of the bore and forcing the pointed portion into the wall of the bore, said peripheral flange being detachable.

7. In combination with a lock cylinder for engaging into the bore of a door, a safety grip, comprising a transverse flange on the inner end of said cylinder and of a diameter slightly smaller than the diameter of the bore and formed at one side with a pointed portion adapted to be forced into the wall of the bore, a groove in the free face of said transverse flange along the periphery, bayonet slots upon the free face of the side wall of said groove, and several flange members having their lower ends engaged in the groove and having pins engaging said bayonet slots to be removable, and screws threadedly engaged through said flange members and adapted to engage against the wall of the bore for forcing the transverse flange slightly laterally so that the pointed portion imbeds itself in the wall of the bore.

8. In combination with a lock cylinder for engaging into the bore of a door, a safety grip, comprising a transverse flange on the inner end of said cylinder and of a diameter slightly smaller than the diameter of the bore and formed at one side with a pointed portion adapted to be forced into the wall of the bore, a groove in the free face of said transverse flange along the periphery, bayonet slots upon the free face of the side wall of said groove, and several flange members having their lower ends engaged in the groove and having pins removably engaging said bayonet slots, and screws threadedly engaged through said flange members and adapted to engage against the wall of the bore for forcing the transverse flange slightly laterally so that the pointed portion imbeds itself in the wall of the bore, a small lip being arranged upon the outer side of the groove and engaging against the outer side at the bottom of said flange members.

JERRY DOBRICHOVSKY.